L. E. ARMENTROUT.
ELECTRIC LOCOMOTIVE FOR COAL CARS FOR USE IN MINING.
APPLICATION FILED DEC. 17, 1910.
1,053,144.
Patented Feb. 18, 1913.
2 SHEETS—SHEET 1.
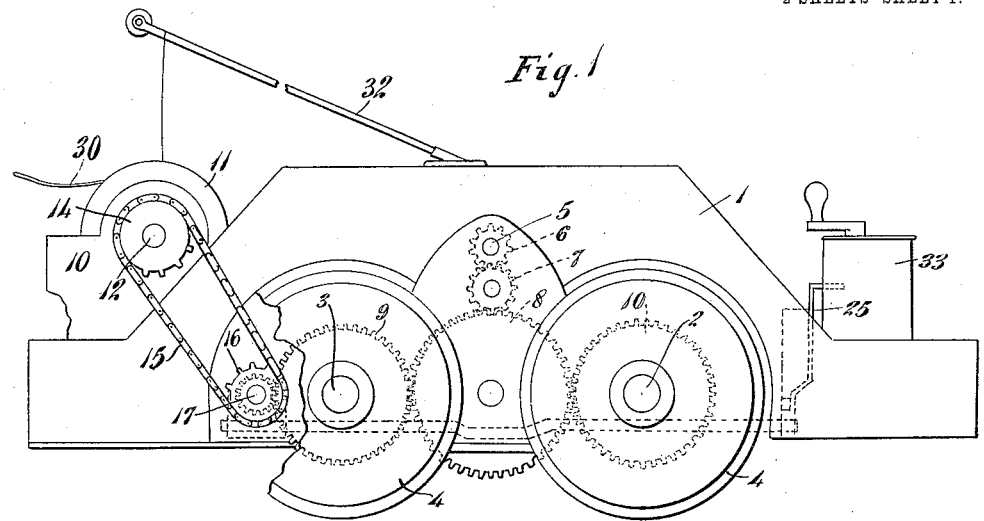
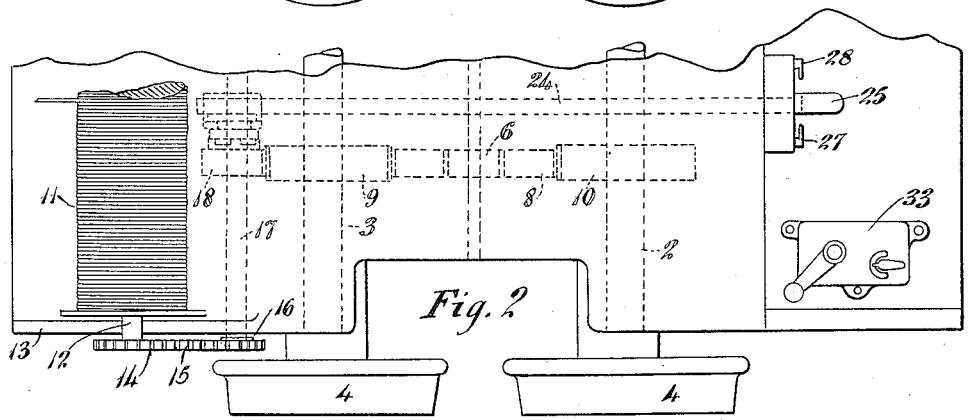
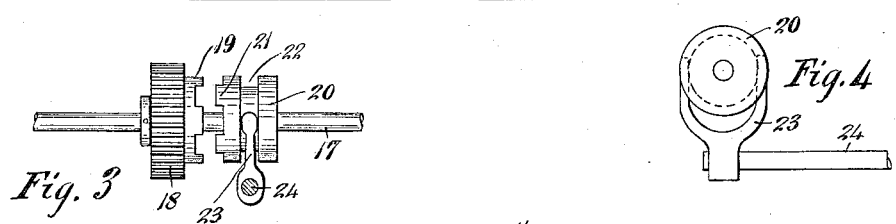
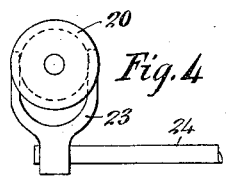
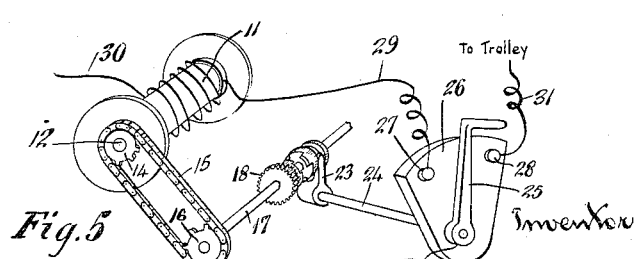

L. E. ARMENTROUT.
ELECTRIC LOCOMOTIVE FOR COAL CARS FOR USE IN MINING.
APPLICATION FILED DEC. 17, 1910.
1,053,144.
Patented Feb. 18, 1913.
2 SHEETS—SHEET 2.
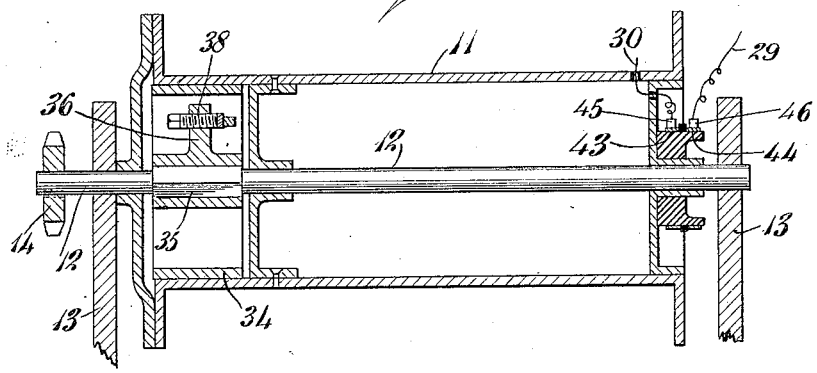
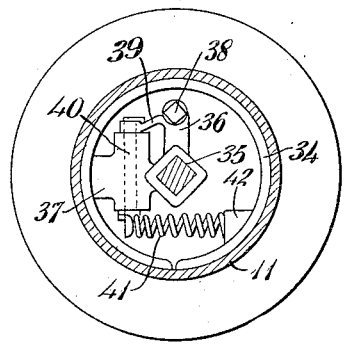

UNITED STATES PATENT OFFICE.

LUTHER E. ARMENTROUT, OF BORDERLAND, WEST VIRGINIA.

ELECTRIC LOCOMOTIVE FOR COAL-CARS FOR USE IN MINING.

1,053,144.  Specification of Letters Patent.  Patented Feb. 18, 1913.

Application filed December 17, 1910. Serial No. 597,902.

*To all whom it may concern:*

Be it known that I, LUTHER E. ARMENTROUT, a citizen of the United States, and a resident of the town of Borderland, in the county of Mingo and State of West Virginia, have invented certain new and useful Improvements in Electric Locomotives for Coal-Cars for Use in Mining, of which the following is a full, clear, and exact description, reference being had to the accompanying drawings, forming a part of this specification.

In the use of electric locomotives for hauling dump cars in mines, it frequently happens that there is no room for the use of the ordinary trolley wire and trolley arm for conveying the current to the motor, and it is usual to provide a reel upon which is wound a supply cable, through which the current may be conveyed from the source of supply when the ordinary trolley connections can not be utilized. This reel is mounted on the locomotive carriage and is geared up with the driving mechanism so that the reel can be driven to pay out the cable as the locomotive advances, or wind it up when moving in the opposite direction. Such locomotives are provided with the usual controller for regulating the current, with a switch for connecting the transmission wires either from the trolley arm or from the cable on the reel, and also with a clutch device and operating lever to connect and disconnect the driving mechanism for the cable reel. Heretofore, however, in such apparatus, the clutch operating mechanism has had no connection with the switch devices for transferring the current from the trolley arm or the cable as may be required; and as a result, it frequently happens that, through carelessness or otherwise, the driving mechanism for the reel is not thrown into engagement when the use of the trolley is discontinued, and the cable coupled up with the source of supply. Under these conditions, the car will advance in one direction and pay out the cable, but when the locomotive is driven in the opposite direction, if the clutch mechanism for the reel is not in engagement, the reel will not operate and the cable will become hopelessly tangled, or cut to pieces by the car.

It is to overcome these objections that my invention is provided, and it consists of that certain novel construction and arrangement of parts to be hereinafter particularly pointed out and claimed, in which the switch lever and clutch operating mechanism for the reel are positively coupled together, so that it will be impossible to turn the current through the cable without insuring the engagement of the clutch mechanism for the reel.

In the drawings,—Figure 1 is a side elevation of an electric locomotive embodying my improvements. Fig. 2 is a plan view of a portion of the construction shown in Fig. 1. Fig. 3 is a detail view showing the clutch, and Fig. 4 an end view of the same. Fig. 5 is a diagrammatic illustration showing the two-way switch and clutch operating lever construction. Fig. 6 is a central longitudinal section of the reel. Fig. 7 is a cross section of the same, taken through the friction pulley.

As there is nothing of novelty in the locomotive itself, I have only illustrated the parts in outline, in which 1 designates the framework or carriage for the operating parts in which are suitably journaled and mounted the car axles 2, 3, with flanged car wheels 4, 4, for carrying and propelling the locomotive on the track. The armature shaft for the electric motor is indicated at 5, and through the pinion 6 mounted on the armature shaft, the idler 7 and the gear 8, the rotations of the armature shaft are communicated to the gears 9 and 10 mounted on the car axles 2 and 3, suitable provision being provided for journaling the several gears and for rotating them in either direction to propel the locomotive in the direction desired.

The cable reel is indicated at 11, provided with the spindle 12, suitably journaled at the ends in supporting standards 13. The spindle 12 is provided with a sprocket wheel 14, connected by sprocket chain 15 with a sprocket wheel 16, mounted on one end of the shaft 17, journaled in the main framework, parallel with the car axles. This shaft 17 carries the gear 18 loosely mounted thereon, in mesh with the gear 9, and this gear on one face is provided with the notched clutch member 19.

Mounted by spline and groove adjacent to the clutch member 19 is a sleeve 20, provided with teeth 21, corresponding to the notches of the clutch member 19. The sleeve 20 is provided with an annular groove 22, which is engaged by the bifurcations of the fork 23 mounted on the inner end of the rod 24. This rod 24 is suitably journaled in the framework and carries at its front end an operating lever 25, by means of which the rod 24 can be rocked to throw the clutch sleeve 20 into and out of mesh with the opposing clutch member of the gear 18. In this way, the sprockets for driving the cable reel will be thrown into and out of engagement. This operating lever 25 for the clutch serves also as a switch lever for the two-way switch, indicated at 26 for controlling the current. The two-way switch is provided with a pair of contacts 27 and 28. The contact point 27 is in electrical connection by wire 29 with the cable 30, and the contact point 28 is in electrical connection by wire 31 with the trolley arm 32. The lever itself is in electrical connection with the controller indicated at 33, proper insulation, of course, being provided for the various contact points and for the switch to prevent any short circuit.

The contact point for the switch lever 25 with which connection is made for the cable coiled on the reel 11 is arranged in such position that when the switch lever makes connection through the controller with the cable contact, the rod or shaft 24 will be rocked to throw the clutch 20 into engagement with the gear 18, and thus to connect the reel driving mechanism with the driving mechanism of the locomotive. In the same way, the contact point 28 for the trolley connection is so positioned that when the switch lever makes this contact, the clutch on the shaft 17 will be disengaged and the reel driving mechanism will remain inoperative. In this way, the electrical motor can never receive its current through the cable without the driving mechanism for the reel being connected with the driving mechanism of the locomotive; and in the same way, the current cannot be received through the trolley connection, except when the reel mechanism is disengaged.

In order that the cable may be properly wound upon the reel, it is of course necessary that some provision should be made to provide a friction clutch between the spindle 12 and the reel 11. Such construction I have illustrated in Figs. 6 and 7. The spindle 12 is provided with a squared portion 35 upon which is mounted a split friction pulley 34, which is held in frictional engagement with the inner surface of the drum 11 by the coiled spring 41, bearing between the lug 42 on one side of the split pulley and an arm on the stud 40 mounted in a bearing block 37, by means of which the tension of the coiled spring is adjusted. This regulation is obtained by the adjustment of the screw 38, which is mounted in a lug 36 on the hub of the pulley, and which engages an arm 39, the rocking of which arm rotates the pin 40 to vary the tension on the coiled spring 41. With this construction, there will be the proper frictional clutch between the driving sprocket 14 mounted on the spindle 12 and the reel drum 11.

In order to make the proper electrical connection between the electrical cable 30 and the wire 29 to the switch, it is of course necessary to provide collector rings, which I have illustrated in Fig. 6 at 43, 44. The brushes 45, 46, bear upon these collector rings and respectively receive the electric current from the cable 30 and convey the same to the wire 29.

In Fig. 5, I have only shown the construction diagrammatically, and merely indicated that the wire 29 is connected with the cable 30, without illustrating the manner of making the connection.

Having thus described my invention, what I claim as new and desire to secure by Letters Patent, is:—

In an electric locomotive, the combination of a carriage with electric motor and driving mechanism for propelling the carriage, with trolley connections for receiving the current from a trolley wire to the motor, and an electric cable for supplying the current to the motor from a source of supply normally disconnected, a reel mounted on the carriage upon which the cable is wound, and a clutch for connecting the reel with the driving mechanism of the carriage, a rod and fork for shifting the clutch, a switch lever for shifting the current from trolley to cable mounted on said rod, with contact points for the lever in connection respectively with cable and trolley whereby the operation of the switch will simultaneously operate the clutch.

LUTHER E. ARMENTROUT.

Attest:
G. W. HOGAN,
J. B. GOODWIN.

---

Copies of this patent may be obtained for five cents each, by addressing the "Commissioner of Patents, Washington, D. C."